Dec. 4, 1928.  1,694,210
C. E. EVERETT
TRACTOR GUIDE
Filed Aug. 27, 1926  2 Sheets-Sheet 1
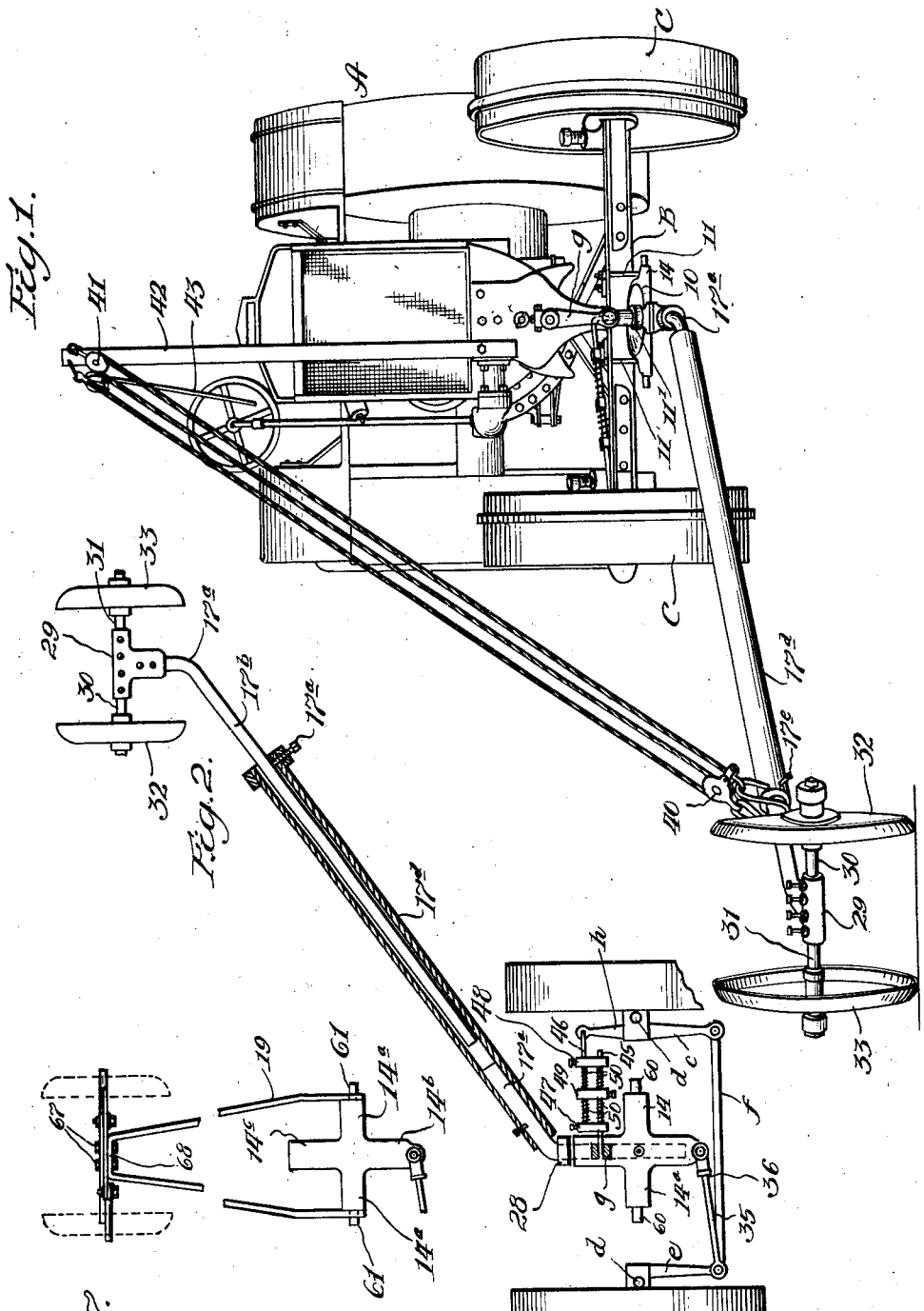

Dec. 4, 1928. 1,694,210
C. E. EVERETT
TRACTOR GUIDE
Filed Aug. 27, 1926    2 Sheets-Sheet 2
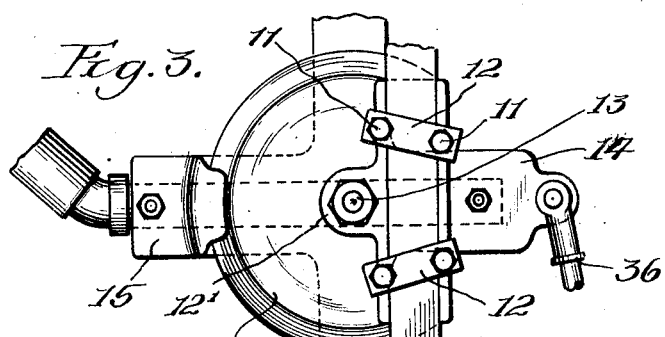
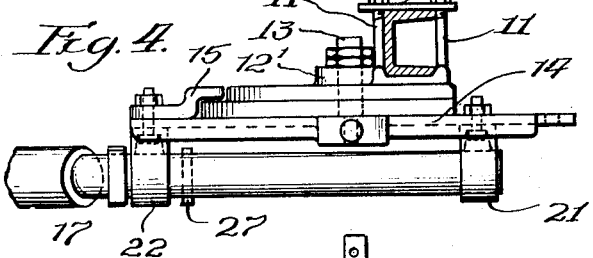
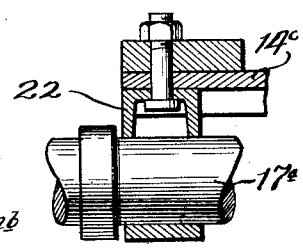
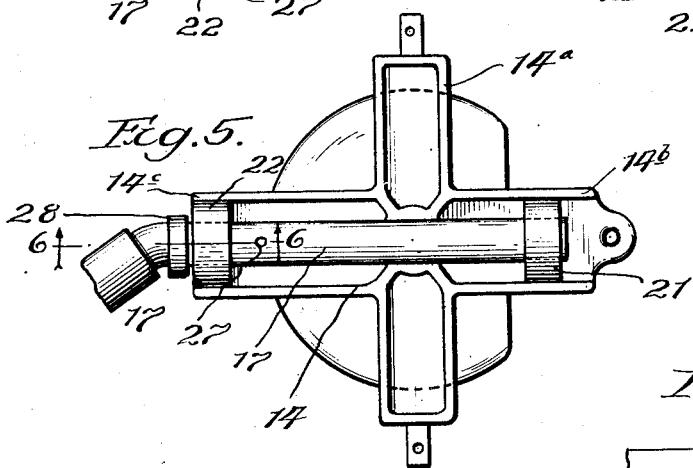
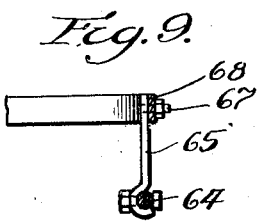
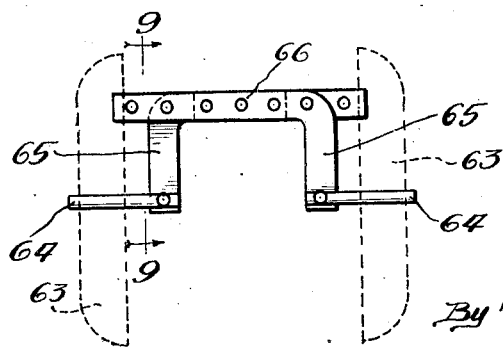
Inventor
Charles E. Everett
By Reeter, Hibben, Davis Macauley
his Attys Patented Dec. 4, 1928.

1,694,210

UNITED STATES PATENT OFFICE.

CHARLES E. EVERETT, OF LONGFORD, KANSAS, ASSIGNOR, BY MESNE ASSIGNMENTS, TO J. I. CASE PLOW WORKS, INC., A CORPORATION OF MARYLAND.

TRACTOR GUIDE.

Application filed August 27, 1926. Serial No. 131,931.

My invention relates more particularly to tractor guides for guiding tractors employed in drawing listers, lister planters and lister cultivators. In such work the tractor must be so guided as to parallel trenches previously made without varying more than two or three inches in either direction, in order to secure the best results, and when this is done manually, it requires very close attention on the part of the operator and is very difficult and tiring. My invention has for its object to substitute mechanical or automatic guiding for manual guiding without, however, depriving the operator of control of the tractor completely, so that he may, without altering the connection, guide the tractor manually when desired.

As the same tractor is ordinarily and conveniently used for listing, lister planting and lister cultivating, it is desirable to provide for readily altering the guiding means so that it may function in either of these operations. In listing and lister planting the tractor must travel alongside a previously formed trench, whereas in lister cultivating the tractor straddles the row being cultivated, or in the case of a three row cultivator it straddles the central row of the three being cultivated. My invention provides means whereby the guiding means may be readily changed to adapt it to either of these operations. Furthermore it is adapted to guiding a tractor traveling on either side of a previously formed trench as is required when listing or planting in rows back and forth across the field.

My improved construction comprises a guide element proper for following a trench mounted upon a pair of gong wheels and so connected to the steering mechanism of the tractor as to turn and control the direction of the front or steering wheels of the tractor to insure that the tractor moves parallel to the trench. When listing or lister planting the guide element is mounted to travel in a trench at either side of the tractor and means are provided by which it may be readily swung from the one side to the other thereof. In lister cultivating the guiding element is mounted to travel directly in front of the tractor. Other features and advantages of my improved tractor guide will appear from the following detailed description taken in connection with the drawings accompanying and forming a part of this application. It is to be understood, however, that the specific disclosure is for the purpose of exemplification only and that the scope of the invention is defined in the following claims in which I have endeavored to point out the novelty thereof without, however, relinquishing or abandoning any feature thereof.

In the drawings accompanying and forming a part of this specification. Fig. 1 shows a tractor in front elevation to which my invention has been applied as adapted for listing and lister planting; Fig. 2 is a top plan view, partly in horizontal section, of the same, parts being omitted for the sake of clearness; Fig. 3 is a top plan and Fig. 4 a side elevation partly in vertical section of a detail; Fig. 5 a bottom plan of certain elements of the same detail, other elements being omitted for the sake of clearness; Fig. 6 is a vertical section of a detail on the plane of the line 6—6 of Fig. 5; Fig. 7 is a view similar to Fig. 2 but showing the structure modified for lister cultivating; Fig. 8 a front view of the guiding element as it is preferably employed in lister cultivating and Fig. 9 a detailed section on the line 9—9 of Fig. 8. Each part is identified by the same reference character wherever it occurs in the several views.

It will be obvious from the detailed disclosure hereinafter that my invention is applicable with minor mechanical changes, to all forms of tractors commonly employed in connection with agricultural operations of the character above mentioned, and I have shown it as applied to a tractor of known form. The tractor as a whole is shown at A, B being the front axle thereof. The front wheels C are indicated as mounted in the usual manner on the knuckles $d$, the steering arms being connected as usual by a bar $f$ so that said wheels may be swung together in steering the tractor. An arc plate 10 is bolted beneath the axle by means of bolts 11 and cross ties 12. The arc plate 10 is formed at its center with a boss 12 which is bored to form a bearing for the bolt 13 which supports the T-frame 14 to be now described. This frame, as best seen in Fig. 5, comprises the transverse arms 14$^a$, the forward arm 14$^c$ and the rearward arm 14$^b$. The T-frame has a limited arc of movement about the pivot pin or bolt 13, which may be integral with, or secured thereto, and is provided with a finger or bracket 15, bolted thereto and embracing the arcuate edge of the arc plate 10 to guide the frame in its oscillatory movement and prevent excessive wobbling. The T-frame is designed to receive the arm 17 connected to the guide element 18, when the tractor is to be used for listing, and to receive the yoke 19 to which the guide element 20 is connected when cultivating with a lister. In the former case bearing eyes or castings 21, 22 are secured to the under side of the ends of arms $14^b$, $14^c$ respectively, said eyes being received into the channels 23, 24 formed in the under surfaces of the respective arms, and secured in said channels by bolts 25, 26 respectively. The arm 17 comprises the bent section $17^a$, the elongated section $17^b$ bent at its end as at $17^c$ and the sleeve $17^d$. The sleeve 17 is riveted to the section $17^a$ and section $17^b$ is adjustable in the sleeve for a purpose which will appear. It may be locked in position by the screw bolt $17^e$. The rear end of the section $17^a$ extends through the eyes 21, 22 on the T-frame and is journalled therein, a pin 27 preventing it from slipping out. The collar 28 prevents longitudinal motion of the rod section $17^a$ in the other direction. A casting or forging 29 is secured to the forward end of the adjustable member $17^c$ of the guide arm and carries on its opposite sides spindles 30, 31 on which the gong-shaped guide wheels 32, 33 are respectively mounted.

It will be evident that with the above described construction the guide element may be adjusted with reference to the tractor when it is desired to alter the spacing of the trenches or furrows. The rear arm $14^b$ of the T-frame is connected to the steering arm $e$ of one of the knuckles $d$ by means of a link 35 made in telescopic sections which may be adjusted with reference to each other by the thread and threaded socket 36.

Obviously, with the construction thus far described, when the tractor is in operation drawing a lister or lister-planter, and traveling parallel to a previously formed trench, in which the guide element is traveling, any turning motion of the tractor at an angle to the trench in which the guide element is running is accompanied by a turning of the T-frame which immediately turns the front or steering wheels of the tractor in a direction to counter-act the deviation. In order to determine and adjust the distance of the tractor path from the previously formed trench or furrow, the effective length of the arm 17 is adjusted by sliding the section $17^b$ in the sleeve $17^d$ and then locking the parts by means of the set screws $17^b$.

As heretofore stated, it is necessary in listing back and forth across a field, turning the tractor at each end of the field, that the guide operate first on one side of the tractor and then on the other. For this purpose it is only necessary to raise the guide while the tractor is turning around and then throw it over to the other side about the journalled rear end of the arm 17. It is convenient, however, to provide means within reach of the operator on the tractor, for this purpose, so that he may swing the guide from one side to the other without leaving his seat. I have shown an ordinary block and tackle for this purpose, one of the blocks 40 being connected to the forward end of the arm and the other block 41 to an upright 32 upon the front of the tractor. The end of the rope 43 of the tackle is within easy reach of the operator. When the end of the trench is reached and before turning the tractor around, the operator raises the guide by means of the block and tackle and then by a jerk on the rope throws the guide over to the other side of the machine after the latter is in proper position relative to the precedingly formed trench. The guide being then in position to be controlled by the previously formed trench, the tractor may again be started forward, the guide controlling its movement parallel to the trench.

It is desirable, however, that the operator be able at any time to control and steer the tractor from the steering wheel without disconnecting the automatic guide, which may be raised for the purpose by the tackle previously described. For this purpose a yielding connection is interposed between the guide arm $g$ commonly constituting a part of the steering arrangement of the tractor and the forwardly extending arm $h$ of one of the knuckles $d$, see Figs. 1 and 2. The yielding connection comprises a pair of parallel rods 45, 46, one of which is connected to the downwardly extending arm $g$ above mentioned and the other to the arm $h$. Adjustable collars 47, 48 are attached to the bar 46 and free to slide upon bar 45 and an intermediate collar 49 is fastened upon bar 45 and is free to slide upon bar 46. Springs 50 surrounding bars 45, 46 are interposed between said collars under compression and are of such strength as to yield sufficiently to permit the automatic guide to control the movement of the tractor without affecting the steering wheel. When the operator desires to steer the tractor, however, he may put sufficient pressure on the spring through the steering wheel and connection to overcome the directive action of the guide and thus control the movement of the tractor, and of course when the tractor guide is lifted out of the furrow, the tractor may be steered and turned through this yielding connection, the springs being made sufficiently strong for the purpose.

When lister cultivating, as before observed, it is necessary that the lister straddle the trench and the row of corn therein, the tractor wheels traveling on the two adjacent ridges. For this purpose I employ the construction shown in Figs. 7, 8 and 9, dispensing with, or removing the guide and arm shown in Figs. 1 and 2 as well as the journal eyes 21, 22, the construction otherwise remaining the same  The transverse arms 14ª of the T-frame are formed at their ends with pivot pins or arbors 60 and the ends of the yoke 19 are perforated to receive such pivot pins.

Cotter pins 61 serve to hold the ends of the yoke on the arbors.

For lister cultivating I prefer to use the form of guide element shown in Figs. 7, 8 and 9, particularly in view of the fact that the trenches are widened by successive operations of the lister and it is advisable, therefore, to correspondingly adjust the difference between the guide wheels so that they may be properly guided by the walls of the trench. The guide wheels 63 of this form of guide element are respectively mounted on arbor 64, each carried by an angle iron 65. The horizontal members of these angle irons are formed with a series of bolt holes 66 receiving the bolt 67 by which said irons are secured together, the series of holes providing for relative adjustment of the irons whereby the distance of the guide wheels from each other may be adjusted. The bolts 67 also secure the angle irons to the transverse member 68 of yoke 19. Except that the guide element travels directly in advance of the tractor, the operation of this form of guide is manifestly substantially like that of Figs. 1 and 2, and further description thereof is unnecessary.

I claim:

1. A tractor guide comprising a guiding element adapted to follow a previously formed trench, an arm connected to said element, an oscillatory member to which said arm is connected, a support for mounting said member on a tractor, means for connecting said oscillatory member to the spindles of the front wheels of the tractor, and means for yieldingly connecting the spindles of the front wheels of the tractor to the steering means of the tractor.

2. A tractor guide comprising a guiding element adapted to follow a previously formed trench, an oscillatory member, a support for mounting the latter on a tractor to which said member is pivoted, an arm connecting said oscillatory member and guiding element, means for connecting said oscillatory member to the spindles of the front wheels of the tractor, a pair of parallel rods mounted in sliding relation to each other, one of said rods adapted to be attached to the manual steering mechanism of the tractor, and the other to the spindles of the front wheels of the tractor, and springs on said rods yieldingly maintaining them in an intermediate position relative to each other.

3. A guiding element for the purpose described comprising a pair of angle irons, each consisting of a horizontal section and a depending section, a guide wheel journalled on the depending section of each angle iron, the horizontal members of the angle iron being adjustable relative to each other in order to adjust the distance between the guide wheels.

In testimony whereof, I have subscribed my name.

CHARLES E. EVERETT.